US012715340B2

(12) United States Patent
Sprenger et al.

(10) Patent No.: US 12,715,340 B2
(45) Date of Patent: Aug. 25, 2026

(54) LONGITUDINAL ADJUSTER AND VEHICLE SEAT

(71) Applicant: Adient US LLC, Plymouth, MI (US)

(72) Inventors: Erik Sprenger, Wermelskirchen (DE); Ingo Quast, Düsseldorf (DE)

(73) Assignee: Adient US LLC, Plymouth, MI (US)

( * ) Notice: Subject to any disclaimer, the term of this patent is extended or adjusted under 35 U.S.C. 154(b) by 314 days.

(21) Appl. No.: 18/580,183

(22) PCT Filed: Jul. 21, 2022

(86) PCT No.: PCT/IB2022/056728
§ 371 (c)(1),
(2) Date: Jan. 18, 2024

(87) PCT Pub. No.: WO2023/007323
PCT Pub. Date: Feb. 2, 2023

(65) Prior Publication Data

US 2024/0317116 A1 Sep. 26, 2024

(30) Foreign Application Priority Data

Jul. 26, 2021 (DE) ..................... 10 2021 119 313.3
Dec. 22, 2021 (DE) ..................... 10 2021 214 875.1
Mar. 15, 2022 (DE) ..................... 10 2022 202 545.8

(51) Int. Cl.
*B60N 2/06* (2006.01)

(52) U.S. Cl.
CPC .......... *B60N 2/067* (2013.01); *B60N 2205/20* (2013.01)

(58) Field of Classification Search
CPC ............................ B60N 2/067; B60N 2205/20
See application file for complete search history.

(56) References Cited

U.S. PATENT DOCUMENTS 2,385,194 A * 9/1945 Carroll ...................... F16H 1/16 74/441
3,170,337 A 2/1965 Linley, Jr.
(Continued)

FOREIGN PATENT DOCUMENTS

DE 3919378 A1 12/1989
DE 102004048228 A1 5/2005
(Continued)

OTHER PUBLICATIONS

European Patent Office, International Search Report and Written Opinion in Application No. PCT/IB2022/056728, dated Sep. 26, 2022, 14 pages, Rijswijk, Netherlands.

*Primary Examiner* — Philip F Gabler
(74) *Attorney, Agent, or Firm* — Marshall & Melhorn, LLC

(57) ABSTRACT

A longitudinal adjuster for a vehicle seat may have a first rail and a second rail. The rails may form an internal channel and the first rail may be displaceable relative to the second rail in the longitudinal direction. A spindle nut may be connected to the second rail and a spindle which cooperates with an internal thread of the spindle nut and may have an external thread may be arranged in the internal channel. A spindle gear mechanism, which can be driven by a motor and which cooperates with the spindle, may be arranged on an end of the first rail. A damping element may be provided and arranged such that the spindle and the spindle nut are held in a pretensioned manner relative to one another in the axial direction and/or in the radial direction. A vehicle seat may have the longitudinal adjuster.

16 Claims, 13 Drawing Sheets

(56) References Cited

U.S. PATENT DOCUMENTS

| | | | | |
|---|---|---|---|---|
| 5,860,319 | A | 1/1999 | Via | |
| 8,176,805 | B2 * | 5/2012 | Synovzik | F16H 25/24<br>74/89.36 |
| 10,857,912 | B2 * | 12/2020 | Rey | B60N 2/067 |
| 2010/0044542 | A1 | 2/2010 | Koga | |
| 2019/0291603 | A1 * | 9/2019 | Martiny | B60N 2/067 |
| 2024/0317116 | A1 * | 9/2024 | Sprenger | B60N 2/067 |

FOREIGN PATENT DOCUMENTS

| | | | |
|---|---|---|---|
| DE | 102005023095 | A1 | 12/2005 |
| DE | 102006000193 | A1 | 10/2006 |
| DE | 60316483 | T2 | 7/2008 |
| DE | 102008024141 | A1 | 11/2009 |
| DE | 102014201582 | A1 | 7/2015 |
| DE | 102021100886 | A1 | 4/2022 |
| WO | 2022074028 | A1 | 4/2022 |

* cited by examiner 12
14
50
z
y
x 20b
14
12
20
38
40
16
30
40
20a
50
S

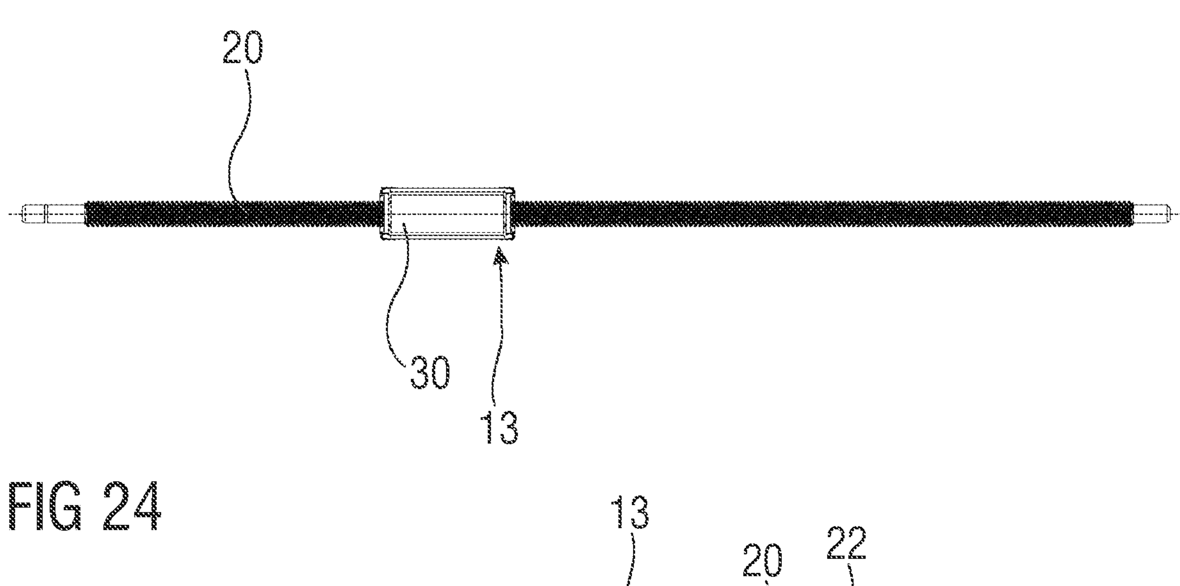
FIG 24
FIG 25
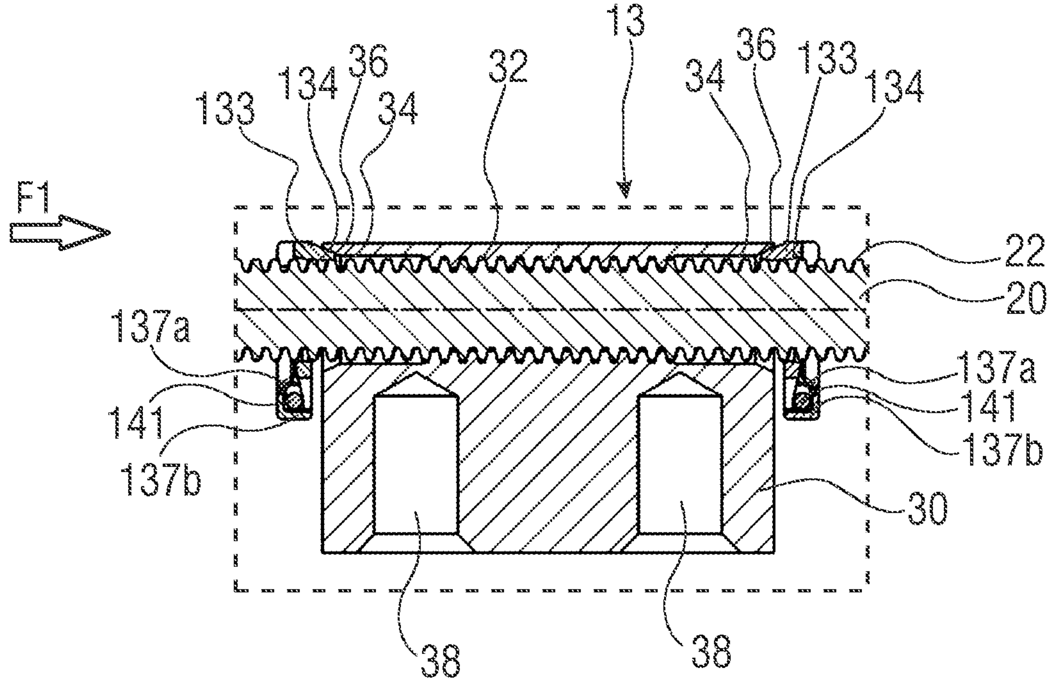
FIG 26

LONGITUDINAL ADJUSTER AND VEHICLE SEAT

FIELD

The invention relates to a longitudinal adjuster, in particular for a vehicle seat. The invention further relates to a vehicle seat having such a longitudinal adjuster.

BACKGROUND

Longitudinal adjusters for seats, in particular vehicle seats, which comprise spindle drive devices for adjusting the seat in the vehicle, are known from the prior art. The drive devices comprise in each case, for example, a spindle, a spindle nut, a gear mechanism and a holding device. The spindle defines a spindle axis and has a spindle thread extending in the longitudinal direction. The spindle nut can be securely fastened to a first rail part and has an internal thread which can engage in the spindle thread. The gear mechanism can be mounted on one respective other rail part and selectively rotates the spindle about the spindle axis.

A drive device of the type in question for a motor vehicle seat in a sliding device is disclosed in DE 10 2005 023 095 A1. The drive device for use with a motor vehicle seat sliding device comprises fixed and movable rail parts which fit together and which can be moved between a front position and a rear position. The drive device comprises an elongated spindle, a spindle nut, a gear mechanism and an installation device. The spindle defines a spindle axis and has a spindle thread extending in the longitudinal direction. The spindle nut can be securely fastened to a first rail part and has an internal thread which can engage in the spindle thread. The gear mechanism can be mounted on one respective other rail part and selectively rotates the spindle about the spindle axis. The spindle of the drive device is provided with a spindle wheel which in the mounted state of the drive device extends outwardly through spindle wheel openings of the movable rail part.

A seat sliding device which has a system with a floating threaded spindle and a fixed nut is disclosed in DE 10 2006 000 193 A1. The nut is fastened to the lower rail, while the threaded spindle is rotated thereby, so that the upper structure can move forwards and backwards. Once this system is applied, the nut is fastened to the lower rail.

A spindle bearing arrangement for a seat longitudinal adjustment gear which has a housing which can be fastened by a fastening arrangement to a component fixed to the vehicle or to a component fixed to the seat, is disclosed in DE 10 2008 024 141 A1, wherein a spindle opening for guiding through a spindle along a spindle opening axis passes through the housing and wherein an internal thread is configured in the housing in the region of the spindle opening thereof, for engaging in a spindle guided through in this manner, for adjusting the housing and the spindle relative to one another along the spindle opening axis. The spindle bearing arrangement provides that the internal thread is configured in a spindle nut and the spindle nut is adjustably mounted in the housing relative to the spindle opening axis.

An alternative drive device for a motor vehicle seat which has a spindle held fixedly in terms of rotation in a first rail which is fixed to the vehicle, in combination with a driven spindle gear mechanism held in a second rail which is fixed to the seat, is disclosed in DE 10 2014 201 582 A1. Such drive devices do not have a fixed spindle nut.

A drive device comprising a spindle, a carrier element having a hole through which the spindle is guided, a nut element which is arranged inside the carrier element and which comprises a nut, which has an internal thread and in which an external thread of the spindle engages, is disclosed in US 2010/0 044 542 A1. The nut element is relatively movable in an axial direction. The drive device has a resilient housing which is arranged between the nut element and the support element. The resilient housing also has a hole, the axial central point thereof coinciding with the internal thread of the nut and resiliently holding the external thread of the spindle on an internal peripheral surface.

An adjusting device is disclosed in DE 10 2004 048 228 A1, the adjusting device comprising a nut which is floatingly mounted on a rigid slide and a spindle drive which is screwed into the nut, wherein the spindle drive is rotatably mounted without radial play in a bearing which is fixedly connected to the slide.

An electrical seat for a vehicle, comprising a upper rail which is attached fixedly to the seat, a lower rail which is attached fixedly to a floor of the vehicle, a nut unit which is attached fixedly to one of the upper rail or the lower rail, a drive shaft which is guided through the nut unit, a motor which is attached respectively to the other of the upper rail or the lower rail, and comprising a gear unit for transmitting a torque of the motor to the drive shaft, is disclosed in DE 603 16 483 T2. The nut unit comprises a nut block with a through-hole which has an internal thread and through which the drive shaft passes, a holder with a front upright wall, a rear upright wall and a coupling portion which couples the front upright wall and the rear upright wall in order to define a space for holding the nut block, wherein both the front upright wall and the rear upright wall have outwardly protruding support walls.

A drive device which is suitable for an electrical seat adjuster is disclosed in U.S. Pat. No. 5,860,319 A. The drive device comprises a rotatable threaded shaft which is arranged between an upper rail and a lower rail. The threaded shaft is movably mounted relative to the stationary lower rail. Coaxial openings are configured in opposing side limbs of a housing for a drive block which is fastened to the lower rail. The drive block has a bore which is in threaded engagement with the threaded shaft. The drive block is arranged in coaxial alignment with the openings in the two side limbs of the housing. A resilient cushioning means fills the housing and surrounds the drive block in order to isolate the drive block in terms of oscillation from the housing and the lower rail.

SUMMARY

The object of the invention is to improve a longitudinal adjuster of the type mentioned in the introduction, in particular to provide a longitudinal adjuster with a fixed spindle nut which permits an improved elimination of play and/or an improved tolerance compensation and reduces or prevents a possible generation of disruptive noise in the region of the spindle nut. It is also an object of the invention to provide a corresponding vehicle seat.

This object is achieved according to the invention by a longitudinal adjuster, in particular for a vehicle seat, wherein the longitudinal adjuster comprises at least one rail pair which is formed from a first rail and a second rail, wherein the rails mutually encompass one another, forming an internal channel, and the first rail is displaceable relative to the second rail in the longitudinal direction, wherein a spindle nut, which is connected to the second rail, and a spindle, which cooperates with an internal thread of the spindle nut and has an external thread, are arranged in the internal channel, wherein a spindle gear mechanism, which can be driven by a motor and which cooperates with the spindle, is arranged at one end of the first rail, wherein a damping element or a damping module is provided and arranged such that the spindle and the spindle nut are held in a pretensioned manner relative to one another in the axial direction and/or in the radial direction.

It is possible to eliminate and/or to compensate substantially for free axial play and/or radial play between the spindle and the spindle nut by the damping element according to the first exemplary embodiment or the damping module according to a second exemplary embodiment. Furthermore, the advantages of the invention, in particular, are to increase a service life and period of use of the longitudinal adjuster. Moreover, disruptive noise which is generated by oscillations and/or vibrations during an operation of the longitudinal adjuster between the components of the longitudinal adjuster is substantially reduced.

Advantageous embodiments which can be used individually or in combination with one another form the subject of the dependent claims.

According to the first exemplary embodiment, the spindle nut can have a single damping element which pretensions the spindle relative to the internal thread of the spindle nut radially in a first direction, such that the thread flanks of the external thread are pushed against the thread flanks of the internal thread. According to the second exemplary embodiment, the spindle module can also be designed to pretension the spindle relative to the internal thread of the spindle nut radially in a first direction, such that the thread flanks of the external thread are pushed against the thread flanks of the internal thread. As a result, a radial spacing of the thread flanks of the external thread and the thread flanks of the internal thread can be increased or are increased in a second direction opposing the first direction.

A free axial play can be eliminated since the spindle nut has a damping element or a damping module, which in each case pretensions the spindle relative to the internal thread of the spindle nut radially in a first direction, such that the thread flanks of the external thread are pushed against the thread flanks of the internal thread, and a radial spacing of the thread flanks of the external thread and the internal thread is increased in a second direction opposing the first direction.

In a further embodiment, the damping element is fastened to the spindle nut. The damping element is configured in the form of a clamp element or clip element.

The spindle is preferably radially pushed in a first direction relative to the internal thread of the spindle nut, such that the spindle is arranged eccentrically relative to the internal thread in the first direction.

The first rail is preferably a seat rail which can be connected to a vehicle seat. The second rail is preferably a floor rail which can be connected to a vehicle structure. A possible internal construction and the mode of operation and function of the spindle gear mechanism is disclosed, for example, in DE 10 2013 207 665 A1, the relevant disclosure thereof being expressly incorporated hereby.

The spindle can be mounted with a front end on a front end portion of the spindle in the spindle gear mechanism. The spindle can be mounted with a rear end on a rear end portion of the spindle in a rotary bearing of the first rail.

The spindle nut can be fixed to the second rail by at least one fixing element, in particular two fixing elements, in particular in the form of threaded bolts. The fixing elements can be guided through one respective opening in the second rail. The spindle nut can have at least one, in particular two, threaded bores which cooperate in each case with a fixing element.

The spindle nut can have a main body. The spindle nut can have a continuous threaded bore with an internal thread, in particular parallel to the longitudinal direction. The spindle nut can have openings aligned with the threaded bore, in particular for the entry or exit of the spindle. The internal thread of the spindle nut can be operatively connected to an external thread of the spindle. The spindle nut is designed, in particular, in one piece. The external thread of the spindle and the internal thread of the spindle nut can in each case be a trapezoidal thread. The trapezoidal thread can have flank play. The spindle can be rotatably mounted along a spindle axis. In the region of the spindle nut the spindle can be pushed in a first direction radially to the spindle axis, so that the spindle is bent eccentrically relative to the spindle axis. The first direction can be oriented downwardly in a vertical direction. The second direction can be oriented upwardly in a vertical direction. The first direction can be oriented in the direction of a base of the second rail. The second direction can be oriented in the direction of a base of the first rail.

The spindle nut can have one respective lead-in surface respectively in the regions adjacent to the internal thread in the axial direction. The lead-in surfaces can be designed in the form of an internal cone. The lead-in surfaces can have the shape of an opening internal cone outwardly in the axial direction. A diameter of the opening of the spindle nut, in particular in the region of the lead-in surfaces, can be reduced inwardly in the direction of the threaded bore. A diameter of the opening can be increased outwardly, in particular can be widened outwardly.

The damping element can be a plastic bushing. The damping element or the damping module can have at least one contact portion encompassing the spindle in some portions.

The damping element can have two opposing contact portions. The contact portions encompass the spindle in each case in some portions. The contact portion of the damping element can have at least one contact segment, which is in contact with the spindle in some portions. The contact portion of the damping element preferably extends to a maximum extent over half the periphery of the spindle.

The damping element can be produced from plastics. The damping element can be produced from a thermoplastic material. The damping element can be produced from polyoxymethylene (POM).

In a further embodiment, the damping element is configured in one piece. For example, the damping element is an injection-molded part. The damping element can be configured in multiple pieces. For example, the damping element comprises two damping halves which in each case are configured mirror-symmetrically, for example. The damping halves are connected together non-positively, by a material connection and/or positively, for example. The damping element can have a coating and/or flocking, for example made from a low-friction and/or damping material.

The contact portion, in particular the contact segment, can have a contact surface which is in contact with the external thread of the spindle. The contact portion, in particular the contact segment, can bear with the contact surface against an external periphery of the external thread of the spindle. The contact surface can have a convex contour in the direction along the spindle axis. The contact surface can extend over at least twice the thread pitch of the external thread of the spindle.

The contact portion can have a tapering contour. The contact portion can have a contour in the form of an external cone. The contact portion can have a spherical contour. The contour, or the external contour, of the contact portion can be in contact with the lead-in surface of the spindle nut. The contact portion can cooperate with the lead-in surface of the spindle nut by the contour, or the external cone.

An entry of the contact portion into the opening in the region of the lead-in surface can increase a force in the radial direction, pushing the spindle into the first direction. At least two contact segments of a contact portion can be connected together by a film hinge.

The damping element can have at least two spring-elastic portions. The spring-elastic portions can be elastically pretensioned in the mounted state. The damping element can have at least two spring-elastic portions which subject the at least one contact portion to a first force in the direction of the spindle nut, in particular respectively in the direction of one of the lead-in surfaces. Preferably, the damping element has an even number of spring-elastic portions.

The spring-elastic portions can apply a first force to the two contact portions, onto one another or toward one another, the two contact portions opposing one another in the axial direction of the spindle. The at least two spring-elastic portions can be arranged on respectively opposing sides of the spindle nut. The at least two spring-elastic portions can be arranged parallel to the spindle axis, respectively on opposing sides of the spindle nut. The at least two spring-elastic portions can obtain their spring-elastic property due to the material properties and/or also due to a shape of the spring-elastic portions.

The at least two spring-elastic portions can be connected together via at least one connecting portion. The at least two spring-elastic portions can be connected together on two opposing sides of the spindle nut via a connecting portion. The at least one connecting portion can act on at least one contact segment of a contact portion. The at least one contact portion can be arranged on a connecting portion. The connecting portions are pretensioned relative to one another, for example, such that they have a spring force oriented toward one another.

The tapering contour of the contact portions, which are operatively connected to one respective lead-in surface of the spindle nut, can change a first force which is oriented parallel to the spindle axis into a second force which is oriented radially in the direction of the spindle. This can be implemented by a wedge action. The spindle can be pushed in the first direction by the second force exerted in the radial direction.

Vibrations can be transmitted to the spindle or oscillations can be excited in the spindle due to vibrations of the motor vehicle during travel or when the engine is running. In the case of an oscillating spindle, in particular in the case of an oscillation transmitted from the spindle, a change in direction of the second force can produce a force which acts counter to the first force.

A damping, in particular an attenuation, of the oscillations can be achieved by small movements and the resulting frictional force of the contour of the contact portions along the lead-in surface of the spindle nut. Due to the damping of the oscillation of the spindle in the radial direction by the damping element, the external thread of the spindle can be prevented from striking radially against the internal thread of the spindle nut.

According to the second exemplary embodiment, the damping module comprises two tensioning elements which are arranged in each case at one end of the spindle nut and are connected together, in particular are held in a pretensioned manner relative to one another, via a spring element which is formed in particular from metal.

According to the second exemplary embodiment, the damping module makes it possible substantially to eliminate and/or to compensate for free axial play and radial play between the spindle and the spindle nut.

Moreover, advantages of the invention, in particular, are to increase a service life and period of use of the longitudinal adjuster. Moreover, disruptive noise which is generated by oscillations and/or vibrations between the components of the longitudinal adjuster in the axial direction and radial direction during the operation of the longitudinal adjuster is substantially reduced. By the use of a spring element, which is formed in particular from metal, for example a metal spring and/or a worm spring, a relatively permanent and constant pretensioning force of the damping module is achieved.

For example, the thread flanks of the spindle nut and the spindle can be held in a pretensioned manner relative to one another, in particular held in contact, by the damping module, such that they are held without play relative to one another. In other words: a free axial play and radial play are substantially eliminated between the spindle nut and the spindle. The spindle is subjected in a defined manner to a force in a radial direction, in particular pushed. A free axial play can be eliminated since the spindle nut has a damping module which pretensions the spindle relative to the internal thread of the spindle nut radially in a direction such that the thread flanks of the external thread are pushed against the thread flanks of the internal thread. A pushing direction of the spindle is oriented, for example, downwardly (in the direction of gravity).

The damping module can have two tensioning elements which are in contact with the spindle in some portions. In the mounted state of the damping module, the tensioning elements can form opposing end portions of the damping module. The tensioning elements can be configured, for example, in the form of contact portions.

The tensioning elements can have in each case at least one tensioning segment which is in contact with the spindle. Alternatively or optionally additionally, in each case the tensioning segments can encompass the spindle at least in some portions. The tensioning segments can be configured, for example, in the form of contact segments or contact portions.

The spindle nut can have an internal thread. A lead-in surface can be provided on one respective end of the internal thread. The lead-in surfaces can have the shape of an internal cone, in particular an opening internal cone, outwardly in the axial direction.

The damping module can be arranged on the spindle nut such that it is in contact with and holds the spindle in a pretensioned manner in the region of the respective lead-in surface. The damping module can have, for example, two tensioning elements which are in contact with the spindle in some portions.

The respective tensioning segment can protrude, for example, substantially perpendicularly from a disk-shaped main body of the tensioning element. The respective tensioning segment can have, for example, a tensioning force, for example a pretensioning force and/or spring force.

One respective tensioning element can have at least one tensioning segment or a plurality of tensioning segments, for example at least two. The plurality of tensioning segments can be connected together. A flexible connection can be provided in the region of a connection of two respectively adjacent tensioning segments, for example. The respective tensioning segment can have a contact surface which is in contact with the external thread of the spindle. The respective tensioning segment can bear with its contact surface against an external periphery of the external thread of the spindle.

The damping module can have at least one tab in an adjacent region of the at least one tensioning segment, for example below and/or above the tensioning segment. The at least one tab can be configured as a holding tab. The damping module can be pre-positioned during the mounting on the spindle nut by the at least one tab, wherein the spindle can also be subsequently screwed in.

For connecting the tensioning elements, the respective tensioning element can have a number of holding portions and additionally a spring element, in particular a retaining spring, can be provided. The at least one holding portion can be configured, for example, in the form of a latching lug, a latching hook or latching finger. The at least one holding portion can protrude from an external face of the main body of the tensioning element. The at least one holding portion can be integrally formed on the main body. A plurality of holding portions or at least two holding portions can be arranged so as to be distributed and/or offset to one another in the peripheral direction of the main body.

A plurality of holding portions or at least two holding portions can be arranged relative to one another such that they form a guide in which the spring element can be received at least in some portions.

The object is also achieved according to the invention by a vehicle seat comprising a longitudinal adjuster as described above.

Described in summary and in other words, in the case of the longitudinal adjuster as described above a spindle can be pushed in a region of a spindle nut in a defined manner in a radial direction. A preferred radial direction for pressing the external thread of the spindle against the internal thread of the spindle nut is oriented or aligned downwardly in the vertical direction (in the direction of gravity).

A cone of a damping element can be used on one side. Via a wedge action, the spindle can be pushed in a defined manner in the radial direction into a threaded toothing, in particular a trapezoidal toothing (with steep tooth flanks). In this manner, a free lateral play and/or axial play can be entirely eliminated.

Lateral spring elements and/or tensioning segments of the damping module can prevent a loss of contact during an adjusting process and thus permanently prevent the rattling noise of a metal-to-metal contact.

To this end, the longitudinal adjuster can have a damping element which is made of a plastics and which is held on the spindle nut.

DESCRIPTION OF THE FIGURES

The invention is described in more detail hereinafter with reference to an advantageous exemplary embodiment shown in the figures. The invention is, however, not limited to this exemplary embodiment. In the figures:

FIG. 24: shows a schematic perspective view of the spindle nut with the screwed-in spindle and the mounted damping module, FIG. 25: shows schematically a sectional view along the line IX-IX in FIG. 23 through the spindle nut with the screwed-in spindle and the mounted damping module, and FIG. 26: shows schematically an enlargement of the sectional view of FIG. 25 in some portions.

DETAILED DESCRIPTION

Parts which correspond to one another are provided in all of the figures with the same reference signs.

Figure 1:
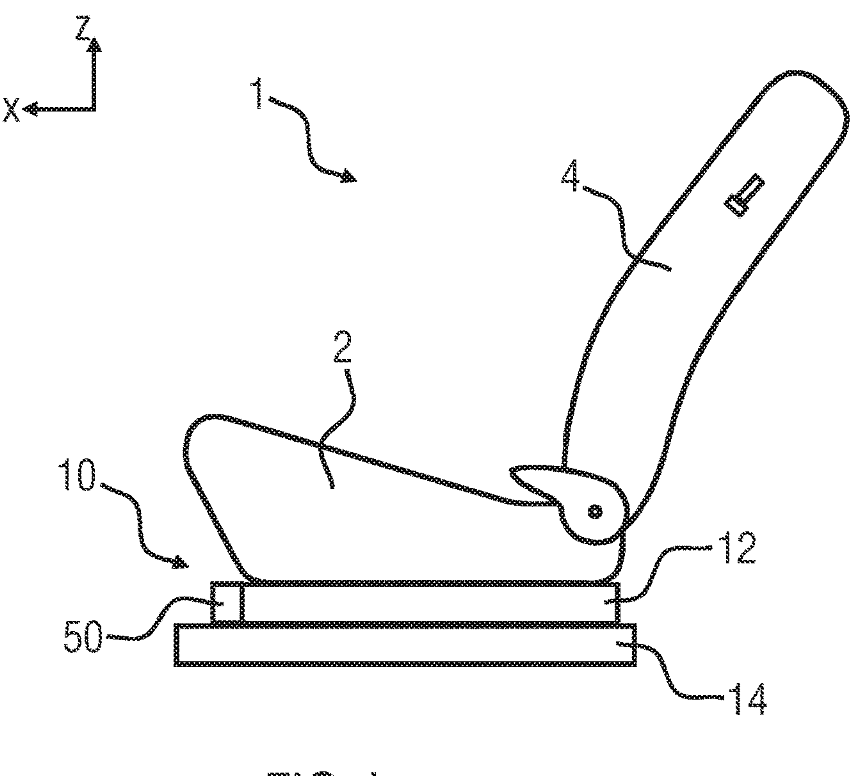
FIG. 1: shows schematically vehicle seat according to the invention.

A vehicle seat 1, which is shown schematically in FIG. 1, is described hereinafter by way of three spatial directions running perpendicularly to one another. A longitudinal direction x runs in a vehicle seat 1 installed in the vehicle substantially horizontally and preferably parallel to a vehicle longitudinal direction which corresponds to the usual direction of travel of the vehicle. A transverse direction y running perpendicularly to the longitudinal direction x is also horizontally oriented in the vehicle and runs parallel to a vehicle transverse direction. A vertical direction z runs perpendicularly to the longitudinal direction x and perpendicularly to the transverse direction y. When a vehicle seat 1 is installed in the vehicle, the vertical direction z runs parallel to the vehicle vertical axis.

The positional information and directional information used, such as for example front, rear, top and bottom, refer to a viewing direction of an occupant seated in the vehicle seat 1 in the normal seated position, wherein the vehicle seat 1 when installed in the vehicle is oriented in a position of use suitable for passenger conveyance with an upright backrest 4 and, as is usual, oriented in the direction of travel. The vehicle seat 1 can, however, also be fitted in a different orientation, for example transversely to the direction of travel.

The vehicle seat 1 shown in FIG. 1 for a motor vehicle has a seat part 2 and the backrest 4 which can be adjusted relative to the seat part 2 in terms of its inclination. An inclination of the backrest 4 can be adjustable by a latching fitting or a geared fitting, for example. The vehicle seat 1 is mounted on a longitudinal adjuster 10 for adjusting a seat longitudinal position.

Figure 2:
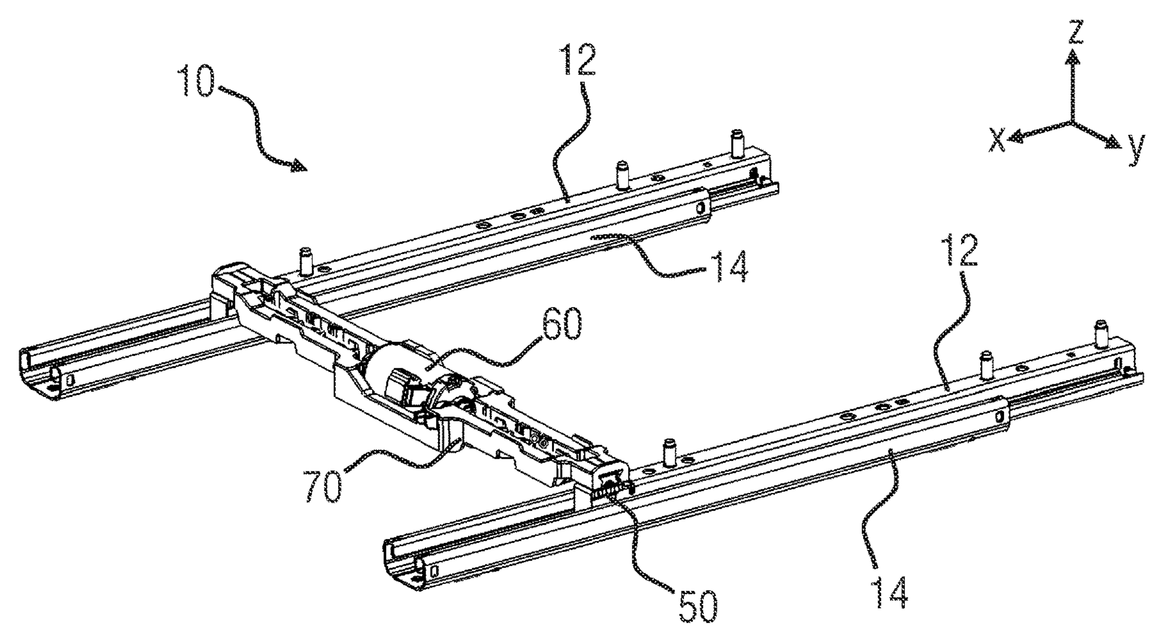
FIG. 2: shows a longitudinal adjuster of the vehicle seat of FIG. 1 according to the invention.
Figures 3, 4:
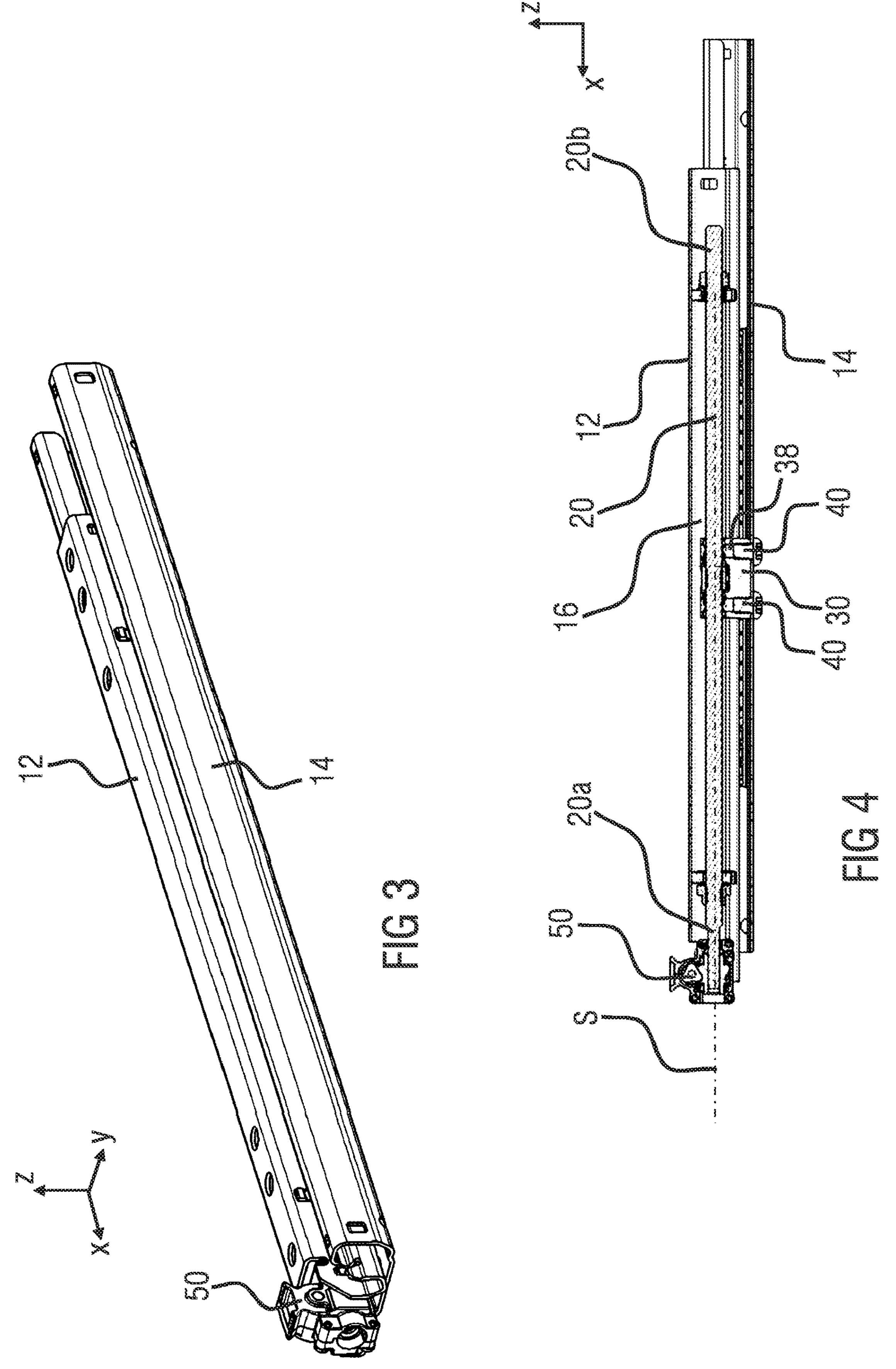
FIG. 3: shows a perspective view of a rail pair of the longitudinal adjuster of FIG. 2, FIG. 4: shows a longitudinal section of the rail pair of FIG. 3, FIG. 5: shows a perspective view of a spindle nut of the longitudinal adjuster according to the invention.

FIG. 2 shows the longitudinal adjuster 10 of the vehicle seat 1 according to the invention. The longitudinal adjuster 10 has at least one rail pair, in the present case two rail pairs. FIG. 3 shows one of the rail pairs of the longitudinal adjuster 10.

The rail pairs are formed in each case from a first rail 12, in particular for connecting to a seat structure of the vehicle seat 1, and a second rail 14, in particular for connecting to a vehicle structure. The rails 12, 14 of the rail pair are displaceable relative to one another in the longitudinal direction x and mutually encompass one another, forming an internal channel 16. A spindle nut 30 which is connected fixedly in terms of rotation to the second rail 14 and a spindle 20 which is operatively connected to the spindle nut 30 are arranged in the internal channel 16.

The spindle 20 extends along a spindle axis S, in the present case parallel to the longitudinal direction x. In modifications of the exemplary embodiments, however, the spindle axis S and the rail pairs can also be oriented slightly inclined relative to the longitudinal direction x. The positional information and directional information used, such as for example axial, radial or "in the peripheral direction", refer to cylinder coordinates relative to the spindle axis S. The spindle 20 is rotatably mounted about the spindle axis S.

A spindle gear mechanism 50, which can be driven by a motor 60 and which drives the spindle 20, is arranged on a front end of the first rail 12. The motor 60 is held on a motor mount 70 which is mounted between the two spindle gear mechanisms 50 of the respective rail pairs, and drives the two spindle gear mechanisms 50 by a shaft, not shown in FIG. 2.

FIG. 4 shows a longitudinal section of the rail pair of FIG. 3. The spindle gear mechanism 50 bears a front end portion 20*a* of the spindle 20. The spindle 20 has a rear end portion 20*b* opposing the front end portion 20*a*. The spindle nut 30 is arranged centrally along the length of the spindle 20, in the state shown in the present case. The spindle nut 30 is fixed by two fixing elements 40, in the present case in the form of screws, to the second rail 14.

The fixing elements 40 are guided through one respective opening in the second rail 14. The spindle nut 30 has two fixing openings 38 which have an internal thread and which cooperate in each case with a fixing element 40. By rotating the spindle 20 about the spindle axis S the spindle nut 30 is screwed as a function of the rotational direction along an external thread 22 of the spindle 20 in or counter to the spindle axis S, which in the present case is oriented parallel to the longitudinal direction x, and thereby displaces the first seat rail 12 relative to the second seat rail 14. Accordingly, a relative position between the spindle 20 and the spindle nut 30 is also displaced.

Figure 5:
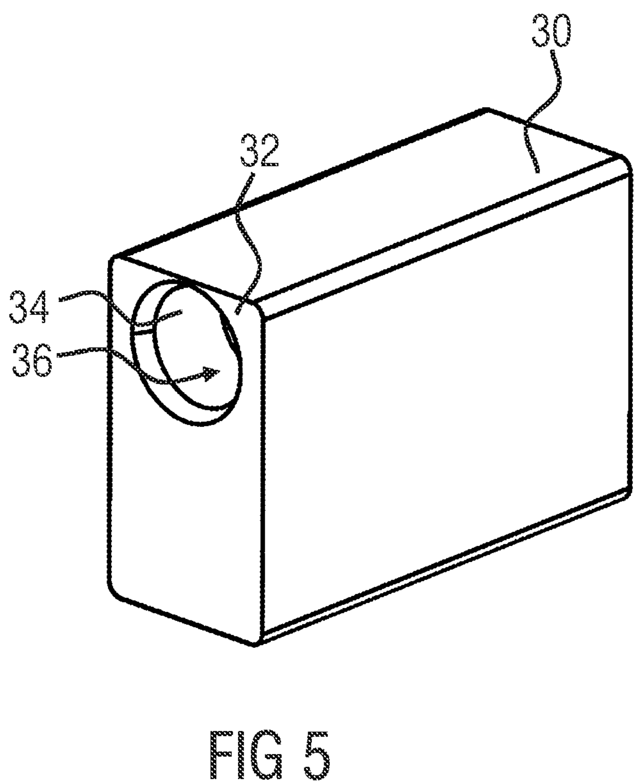
Figure 6:
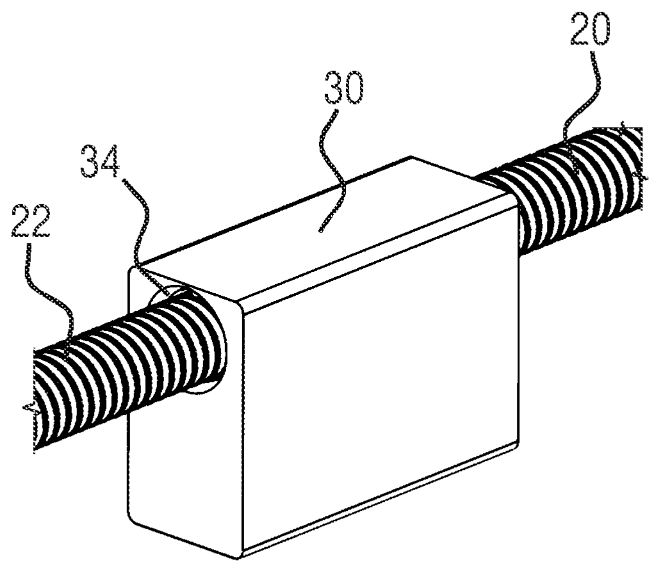
FIG. 6: shows a perspective view of the spindle nut of FIG. 5 with a spindle screwed into the spindle nut.

In FIGS. 5 and 6 a spindle nut 30 of the longitudinal adjuster 10 according to the invention is shown with and without a spindle 20. The spindle nut 30 has a main body. The spindle nut 30 has a continuous threaded bore with an internal thread 32 parallel to the longitudinal direction x. The spindle nut 30 has openings 36 aligned with the threaded bore, in particular for the entry or exit of the spindle 20.

The internal thread 32 of the spindle nut 30 is operatively connected to an external thread 22 of the spindle 20. The spindle nut 30 is preferably designed in one piece. In the present case, the external thread 22 of the spindle 20 and the internal thread 32 of the spindle nut 30 are designed in each case as a trapezoidal thread. The trapezoidal thread can have flank play. The trapezoidal thread generally has a flank angle of 30°. Due to the thread geometry, a trapezoidal thread with flank play results in a ratio between an axial play and a radial play with a factor of, for example, ca. 3.7.

The spindle nut 30 has one respective lead-in surface 34, respectively in regions adjacent to the internal thread 32 in the axial direction. The lead-in surfaces 34 have the shape of an internal cone, in particular an opening internal cone, outwardly in the axial direction. A diameter of the openings 36 of the spindle nut 30 decreases inwardly in the direction of the threaded bore with the internal thread 32. Accordingly, the diameter of the openings 36 increases outwardly.

Figure 7:
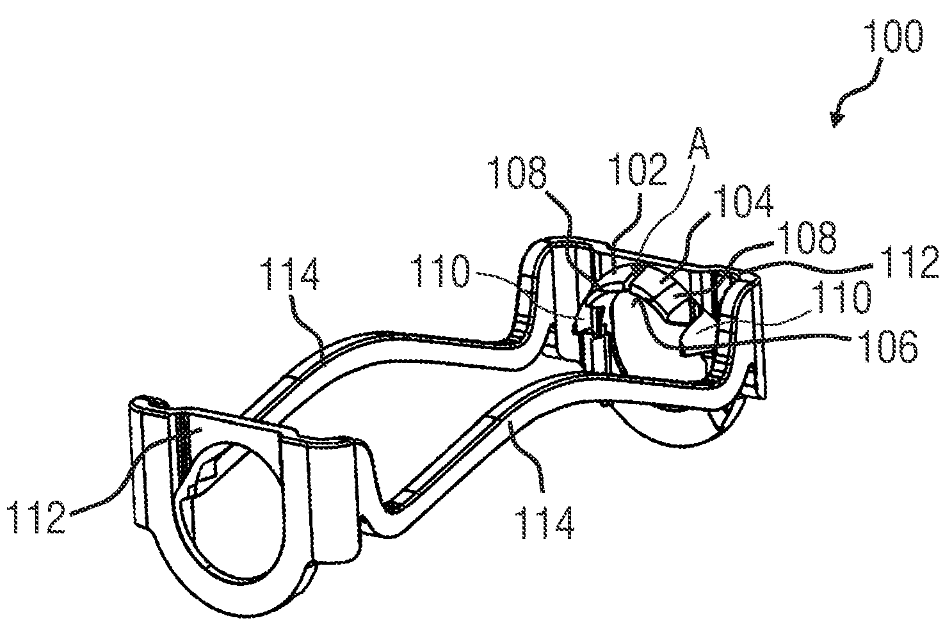
FIG. 7: shows a perspective view of a damping element of the longitudinal adjuster.
Figure 8:
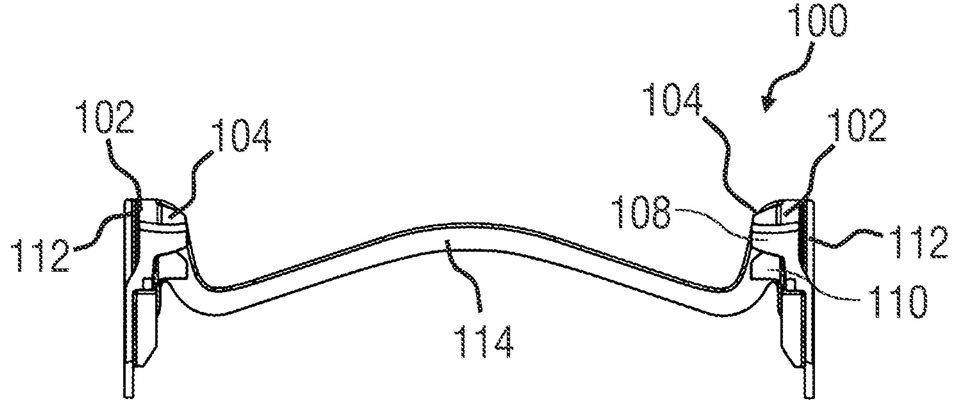
FIG. 8: shows a side view of the damping element of FIG. 7, FIG. 9: shows a perspective view of the spindle nut with the screwed-in spindle of FIG. 6 and the mounted damping element of FIG. 7, FIG. 10: shows in perspective a longitudinal section of the subassembly of FIG. 9, FIG. 11: shows in a detail the sectional view of FIG. 10 in the region of an end portion of the damping element.

In each case, a damping element 100 of the longitudinal adjuster 10 is shown in FIGS. 7 and 8. In the present case, the damping element 100 has two contact portions 102 which are in contact with the spindle 20 in some portions. The two contact portions 102 of the damping element 100 are arranged at opposing end portions of the damping element 100.

The contact portions 102 of the damping element 100 in each case have at least one contact segment 108 which are in contact with or encompass the spindle 20 in some portions. The contact segment 108 has, for example, a tensioning force oriented in a first direction R1 (shown in FIG. 10), for example a pretensioning force and/or spring force.

Each contact portion 102 can have a plurality of contact segments 108. The plurality of contact segments 108 can be connected together. Preferably, a slightly flexible connection is provided in the region of a connection of respectively two adjacent contact segments 108. The damping element 100 is preferably produced from plastics.

The damping element 100 has two spring-elastic portions 114. The spring-elastic portions 114 are connected by a connecting portion 112, in each case on both sides, to two contact portions 102.

The spring-elastic portions 114 are bent once or repeatedly, for example, in the longitudinal direction x. In an alternative embodiment, a spring-elastic portion 114 or both spring-elastic portions 114 can be bent once or repeatedly or substantially run in a straight line.

Each of the contact segments 108 of the contact portions 102 has a contact surface 106 which is in contact with the external thread 22 of the spindle 20. The contact segments 108 bear with their contact surfaces 106 against an outer periphery of the external thread 22 of the spindle 20.

At least one of the contact surfaces 106 can have a convex contour along the spindle axis S. Alternatively, at least one of the contact surfaces 106 can have a partially cylindrical contour along the spindle axis S. The contact surfaces 106 preferably extend over at least twice the thread pitch of the external thread 22 of the spindle 20.

The contact portion 102, in particular each of the contact segments 108, has a tapering contour in the form of an external cone 104. The external cone 104 of the contact portion 102 is in contact with the lead-in surface 34 of the spindle nut 30 in the mounted state.

The damping element 100 has in each case a tab 110 in an adjacent region of the contact segments 108, in particular on both sides below the contact segments 108. During the mounting of the damping element 100 on the spindle nut 30, the tabs 110 serve for pre-positioning the damping element 100 so that the spindle 20 can also be subsequently screwed in. The tabs 110 have, for example, a clip function. The tabs 110 are configured to be substantially flexible and/or elastic. The tabs 110 are configured, in particular, to be reversibly flexible. In an unmounted state of the damping element 100, the tabs 110 have a spring force oriented away from the contact segments 108, for example outwardly oriented. For the pre-positioning, the tabs 110 can be clipped into the spindle nut 30. The tabs 110 prefix the damping element 100 on and/or in the spindle nut 30.

Each of the connecting portions 112 has a corresponding through-opening for the spindle 20. A corresponding lower edge portion of the connecting portion 112 encompasses the spindle 20 in the mounted state and secures the damping element 100 against slipping off the spindle nut 30.

Figure 9:
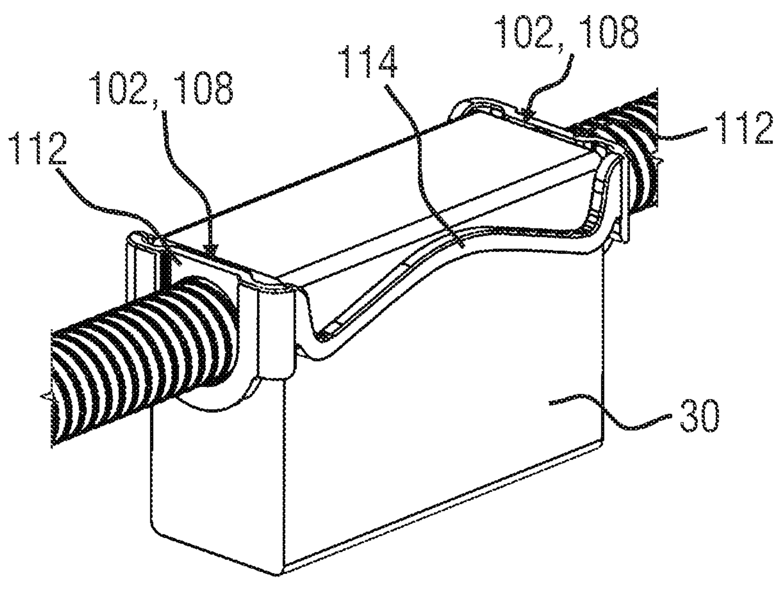

FIG. 9 shows a damping element 100 of FIG. 7 mounted on the spindle nut 30 with the screwed-in spindle 20 of FIG. 6. The two spring-elastic portions 114 extend substantially parallel to the spindle axis S and in the present case are arranged on respectively one of the two opposing sides of the spindle nut 30, in particular in the transverse direction y.

Figure 12:
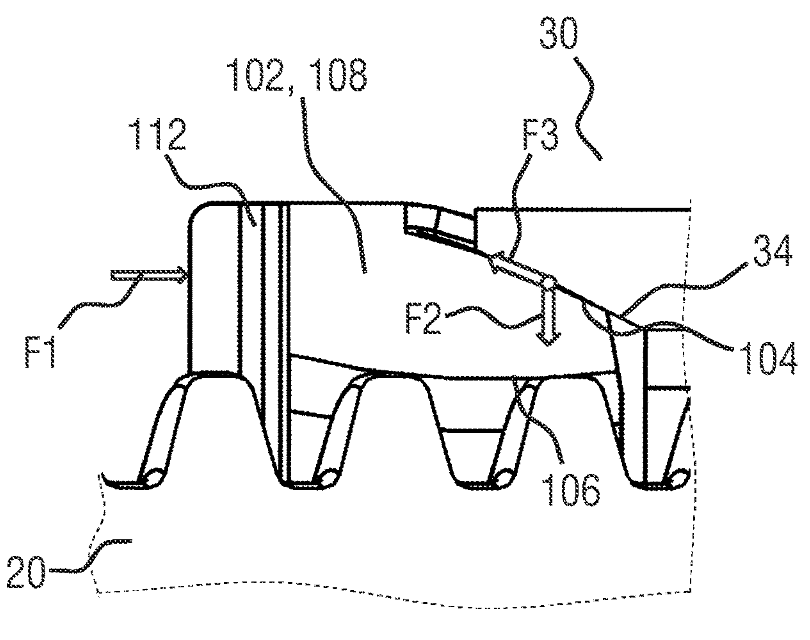
FIG. 12: shows in a detail an enlargement of the detail XII of FIG. 11, FIG. 13: shows in a detail an enlargement of the detail XIII of FIG. 11, FIG. 14: shows in a detail an enlargement of the detail XIV of FIG. 11, FIG. 15: shows schematically an exploded view of a spindle nut and a damping element according to a further exemplary embodiment in which the damping element is configured as a damping module.

The spring-elastic portions 114 generate a pulling force by which the two contact portions 102 are subjected to a first force F1 in the axial direction of the spindle nut 30, in particular in the direction of respectively one of the lead-in surfaces 34 (see FIG. 12). The spring-elastic portions 114 have their spring-elastic property due to material properties and/or also due to a shape of the spring-elastic portions 114.

The cooperation of the forces F1, F2 in the region of the contact segments 108 of the contact portions 102 and the respective lead-in surface 34 of the opening 36 of the spindle nut 30 is similar to the description relative to FIG. 12.

Figure 10:
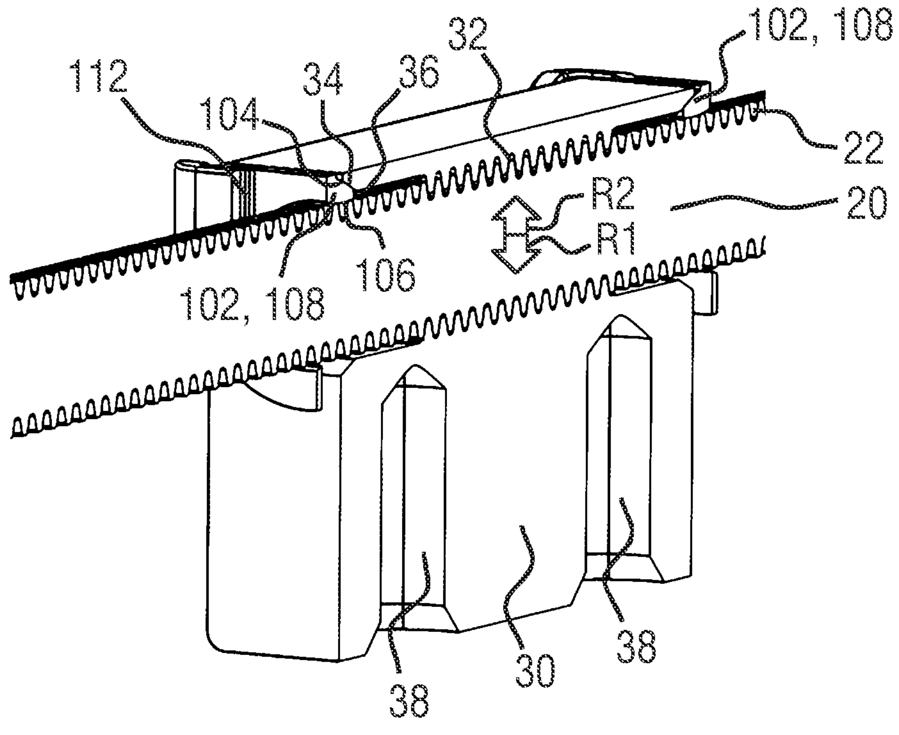

FIG. 10 shows a longitudinal section of the subassembly consisting of the spindle nut 30, spindle 20 and damping element 100 of FIG. 9. The spindle 20 is pushed downwardly, in the present case by the external cones 104 of the two contact portions 102, so that on each side of the spindle nut 30 the contact surface 106 of the respective contact portion 102 bears against at least two threads of the spindle 20.

Figure 11:
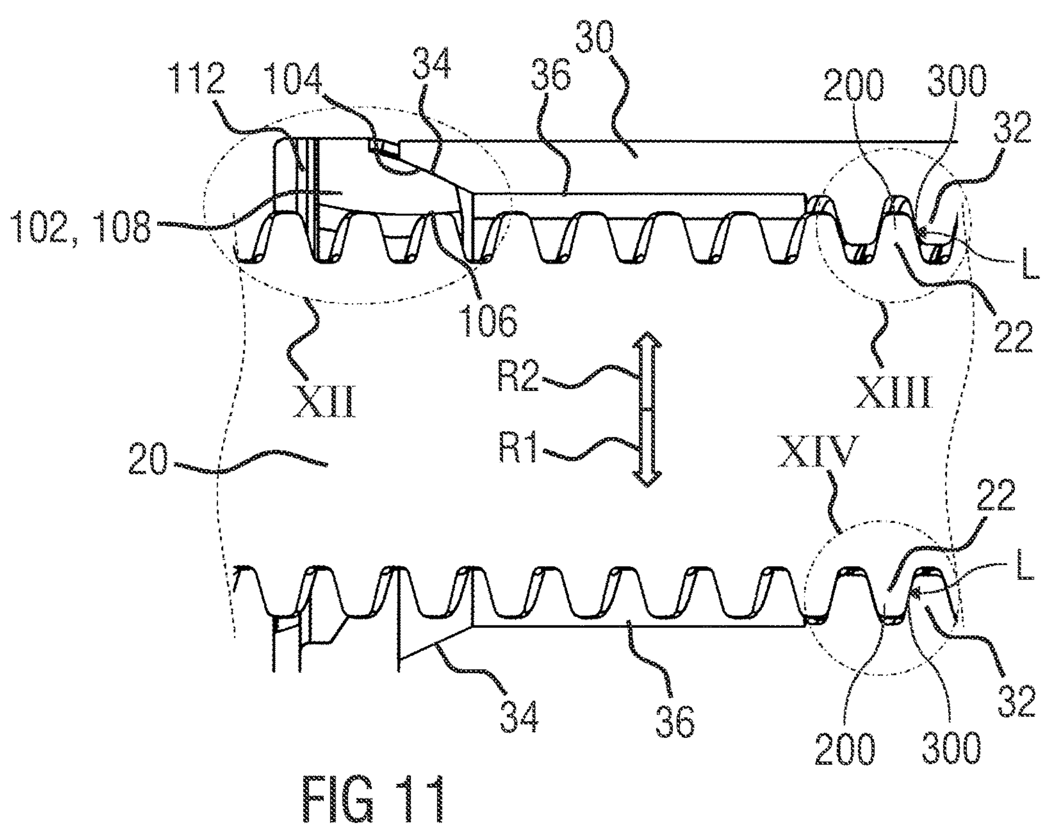

FIG. 11 shows in a detail the sectional view of FIG. 10 in the region of an end portion of the damping element 100. The contact surfaces 106 of the contact portions 102 bearing against the spindle 20 are preferably bent, in order to permit an unhindered movement of the spindle 20.

The spindle 20 is preferably pushed in the direction of a weight force (gravity) acting on the spindle 20. By pushing down the spindle 20, the gaps L which are present between the threads (as identified in FIGS. 11 and 14) between the thread flanks 200 of the spindle 20 and the thread flanks 300 of the spindle nut 30 are eliminated. In particular, gaps L are eliminated between the thread flanks 200 and 300 in the lower portion of the spindle nut 30, in particular in a lower contact region between the spindle 20 and the spindle nut 30.

In the upper portion of the spindle nut 30, in particular in an upper contact region between the spindle 20 and the spindle nut 30, a gap L can be maintained between the respective thread flanks 200, 300.

In an alternative or optionally additional embodiment, the damping element 100 is arranged mirror-symmetrically on the spindle nut 30, for example on a horizontal plane, such that the pretensioning force of the contact segment 108 is oriented upwardly, i.e. in the second direction R2.

The first force F1 generated by the damping element 100 is designed such that a contact between the spindle 20 and the spindle nut 30 in a lower portion of the threads is ensured, even in a state during an adjustment of a seat longitudinal position of the longitudinal adjuster 10 or the vehicle seat 1.

FIG. 12 shows in a detail an enlargement of the detail XII of FIG. 11. As shown in FIG. 12, the contact portion 102 cooperates with the lead-in surface 34 of the spindle nut 30 by the contour, or the external cone 104. An entry of the contact portion 102 into the opening 36 in the region of the lead-in surface 34 causes a reduction in a radial spacing A between the contact segments 108.

The respective contact segment 108 is arranged in some portions or entirely in the opening 36. For example, the lead-in surface 34 positively surrounds the corresponding contact segment 108.

The tapering contour of the contact portions 102 cooperates with an assigned lead-in surface 34 such that, in particular due to a wedge action, a first force F1 parallel to the spindle axis S can be deflected into a second force F2 in the radial direction onto the spindle 20.

The spindle 20 is pushed downwardly by the second force F2 exerted in the first direction R1.

In the case of an oscillating spindle 20, a change of direction of the second force F2 causes a force which acts counter to the first force F1. A damping, in particular an attenuation of the vibrations, is achieved by small movements and a resulting frictional force F3 of the contour of the contact portions 102 along the lead-in surface 34 of the spindle nut 30. Due to the damping of the oscillation of the spindle 20 in the radial direction by the damping element 100, the external thread 22 of the spindle 20 is prevented from radially striking against the internal thread 32 of the spindle nut 30.

Figure 13:
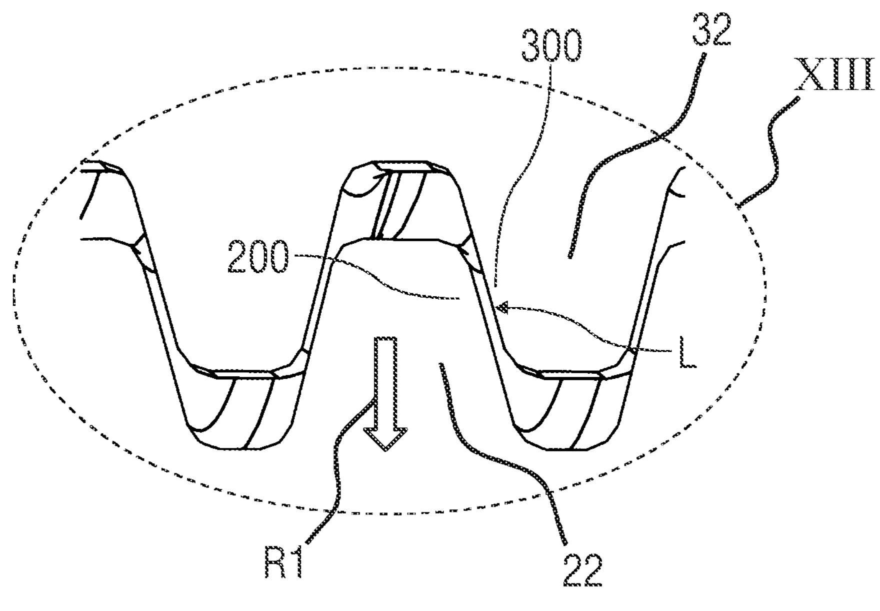

By the two contact portions 102 of the damping element 100 pushing down the spindle 20, the thread flanks 200, 300 of the external thread 22 of the spindle 20 and the internal thread 32 of the spindle nut 30 come into contact in a portion of the threads arranged in the first direction R1, in the present case a lower portion of the threads. FIG. 13 shows this in a detailed enlargement of the detail XIII of FIG. 11. As a result, the entire play between the spindle 20 and the spindle nut 30 is removed in the lower portion of the threads.

Figure 14:
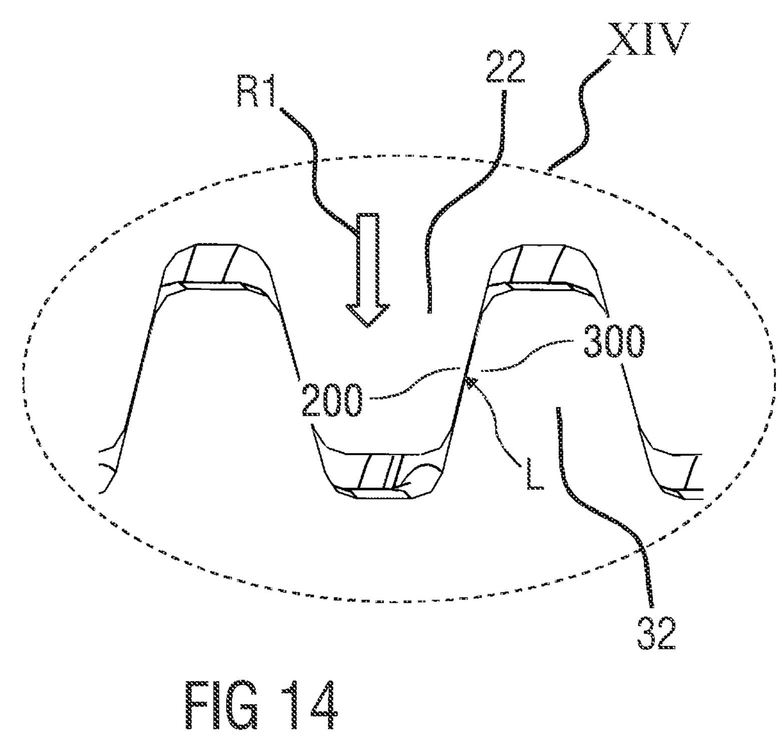

FIG. 14 shows in a detail an enlargement of the detail XIV of FIG. 11. In contrast to the fact that the thread flanks 200 of the external thread 22 and the thread flanks 300 of the internal thread 32 are fully in contact in the lower portion of the threads, a spacing, for example in the form of a gap L, correspondingly increases between the thread flanks 200 of the external thread 22 and the thread flanks 300 of the internal thread 32 in a portion of the threads arranged in a second direction R2, in the present case an upper portion of the threads.

Figure 15:
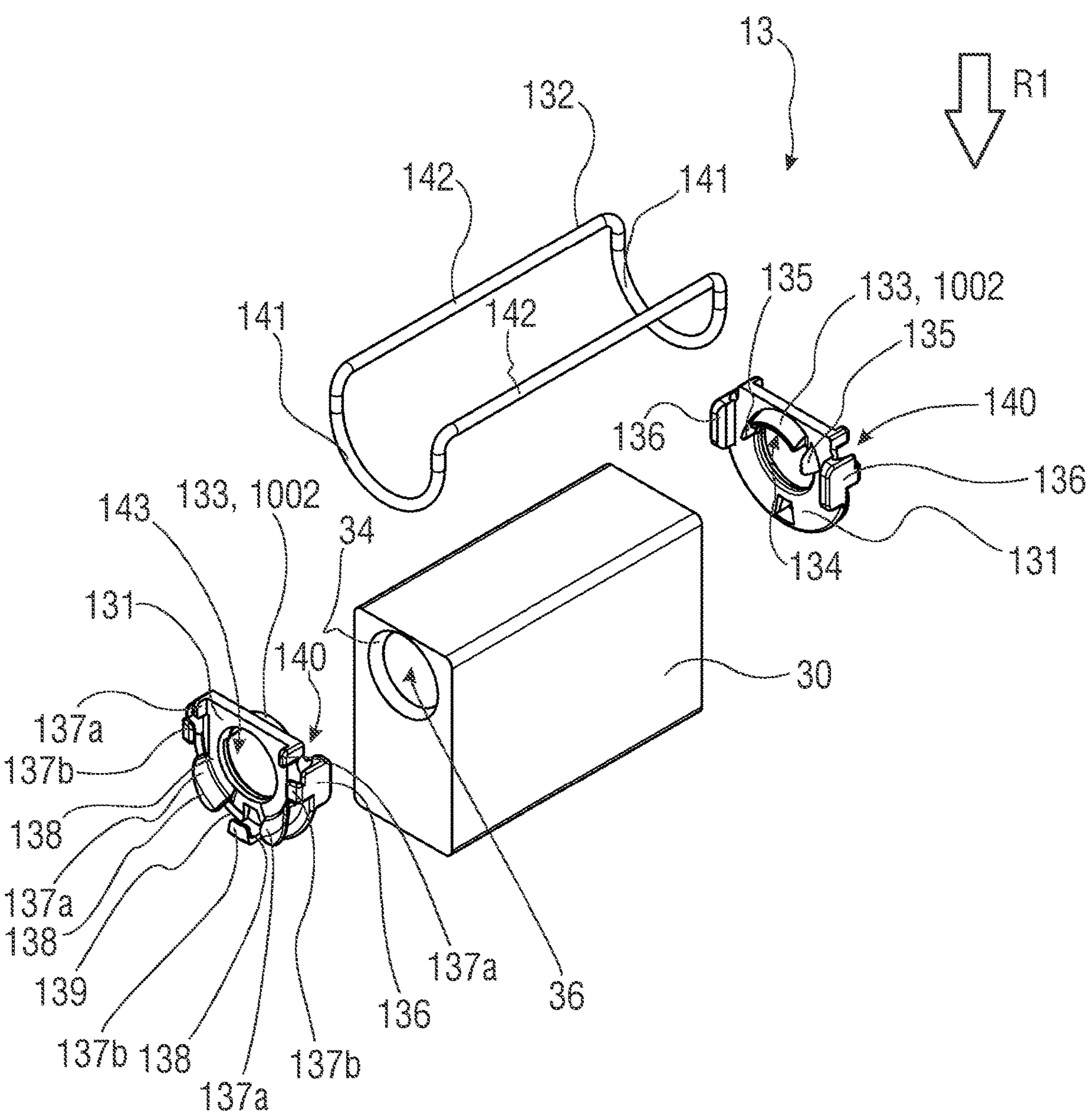

FIG. 15 shows schematically an exploded view of the spindle nut 30 and a damping module 13 according to a second exemplary embodiment of the longitudinal adjuster 10. The damping module 13 is provided to pretension the spindle 20 and the spindle nut 30 relative to one another. The damping module 13 is configured in multiple parts and comprises at least two tensioning elements 131 and optionally a spring element 132 according to a further exemplary embodiment.

The spindle nut 30 has one respective lead-in surface 34 in the internal thread 32, respectively in the adjacent regions in the axial direction. The lead-in surfaces 34 have the shape of an internal cone, in particular an opening internal cone, outwardly in the axial direction. The spindle nut 30 has a main body. The spindle nut 30 has a continuous threaded bore with the internal thread 32 parallel to the longitudinal direction x. The spindle nut 30 has openings 36 aligned with the threaded bore, in particular for the entry or exit of the spindle 20.

A diameter of the openings 36 of the spindle nut 30 decreases inwardly in the direction of the threaded bore with the internal thread 32. Accordingly, the diameter of the openings 36 increases outwardly.

The damping module 13 is provided and is arranged or can be arranged, such that the spindle 20 and the spindle nut 30 are held or can be held in a pretensioned manner relative to one another in the axial direction and in the radial direction. The damping module 13 comprises two tensioning elements 131 which are arranged or can be arranged in each case at one end of the spindle nut 30 and are connected or can be connected together, in particular are held or can be held in a pretensioned manner relative to one another, via a spring element 132 formed from metal.

The damping module 13 has in the present case two tensioning elements 131 which are in contact with the spindle 20 in some portions. In the mounted state of the damping module 13, the tensioning elements 131 form opposing end portions of the damping module 13. The tensioning elements 131 are arranged on front faces of the spindle nut 30.

The tensioning elements 131 have in each case at least one tensioning segment 133, in particular in the form of a contact segment, which come into contact with and/or partially encompass the spindle 20. The tensioning segment 133 can form, for example, a contact portion 1002 with the spindle nut 30.

The tensioning segment 133, for example, protrudes substantially perpendicularly from a disk-shaped main body of the tensioning element 131. The tensioning segment 133 has, for example, a tensioning force, for example a pretensioning force and/or spring force oriented in a direction R1.

Each tensioning element 131 can have a plurality of tensioning segments 133. The plurality of tensioning segments 133 can be connected together. In the region of a connection of respectively two adjacent tensioning segments 133, for example, a slightly flexible connection is provided. The damping module 13 is produced partially from plastics, for example.

The tensioning elements 131 are formed, for example, from plastics and form separate damping components of the damping module 13. Each of the tensioning segments 133 has a contact surface 134 which is in contact with the external thread 22 of the spindle 20. The tensioning segments 133 bear with their contact surfaces 134 against an external periphery of the external thread 22 of the spindle 20.

At least one of the contact surfaces 134 can have a convex contour along the spindle axis S. Alternatively, at least one of the contact surfaces 134 can have a partially cylindrical contour along the spindle axis S. The contact surfaces 134 preferably extend over at least twice the thread pitch of the external thread 22 of the spindle 20.

The tensioning segment 133 has a tapering contour in the form of an external cone. The external cone of the tensioning segment 133 is in contact with the lead-in surface 34 of the spindle nut 30 in the mounted state.

The damping module 13 has one respective tab 135 in an adjacent region of the tensioning segment 133, in particular on both sides below the tensioning segment 133. The damping module 13 also has at least two further tabs 136 in the region of an external periphery of the disk-shaped main body. The tabs 135 are, for example, internal tabs, in particular holding elements. The tabs 136 are, for example, outer tabs, in particular holding elements.

The tabs 135, 136 serve for pre-positioning the damping module 13 during the mounting of the damping module 13 on the spindle nut 30, so that the spindle 20 can also be subsequently screwed in.

The tabs 135, 136 prefix the damping module 13, for example, on and/or in the spindle nut 30. The tabs 135, 136 have, for example, a clipping function and a clamping function. The tabs 135, 136 are configured to be substantially flexible and/or elastic. The tabs 135, 136 are configured, in particular, to be reversibly flexible.

In an unmounted state of the damping module 13, the inner tabs 135 have a spring force oriented away from the tensioning segment 133, for example oriented outwardly. For the pre-positioning, the inner tabs 135 can be clipped into the spindle nut 30.

In an unmounted state of the damping module 13, the outer tabs 136 have a spring force oriented toward the tensioning segment 133, for example oriented inwardly. For the pre-positioning, the outer tabs 136 can be clamped against and/or onto the spindle nut 30.

Each of the tensioning elements 131 has a number of holding portions 137*a*, 137*b* for connecting the tensioning elements 131 to the spring element 132. The holding portions 137*a*, 137*b* are configured, for example, in the form of latching lugs, latching hooks or latching fingers.

The holding portions 137*a*, 137*b* protrude from an outer face of the main body of the tensioning element 131. In particular, the respective tensioning element 131 has alternating holding portions 137*a*, 137*b*. The holding portions 137*a*, 137*b* are arranged on a side of the tensioning element 131 opposing the tensioning segment 133.

The holding portions 137*a*, 137*b* are arranged so as to be alternately offset to one another in the peripheral direction of the main body. Each of the holding portions 137*a*, 137*b* has a portion 138 which is connected to the main body of the tensioning element 131 and a free portion 139, in particular a free end portion, which in one direction forms a receiver.

The holding portions 137*a*, 137*b* are arranged relative to one another such that they form a guide 140 for receiving and fixing the spring element 132. The holding portions 137*a*, 137*b* have, for example a clipping function and/or a clamping function and/or a latching function.

The holding portions 137*a*, 137*b* are configured to be substantially flexible and/or elastic. The holding portions 137*a*, 137*b* are configured, in particular, to be reversibly flexible.

In an unmounted state of the damping module 13, inner holding portions 137*a* have an outwardly oriented spring force, for example in the direction away from the tensioning segment 133. For the connection to the spring element 132, this spring element can be clipped and/or clamped and/or latched in some portions into the holding portions 137*a*, 137*b*.

In an unmounted state of the damping module 13, outer holding portions 137*b* have an inwardly oriented spring force, for example in the direction of the tensioning segment 133.

The spring element 132, formed from metal, runs in the mounted state laterally past the spindle nut 30. A spring element 132 formed from metal, for example a metal metal wire and/or a worm a spring, spring, has substantially permanently constant pretensioning force.

The spring element 132 has a relatively small spring constant and thus is configured to be insensitive to tolerances. The spring element 132 is configured in a simple manner and can be produced cost-effectively.

The spring element 132 comprises two support portions 141 which are spaced apart from one another. The support portions 141 are configured in a substantially U-shaped manner.

The support portions 141 are connected together via two support webs 142. The support webs 142 are respectively connected on both sides to both support portions 141. The support webs 142 are bent once or repeatedly, for example, in the longitudinal direction x. In an alternative embodiment, a support web 142 or both support webs 142 can be bent once or repeatedly or run substantially in a straight line.

The spring element 132 is configured, for example, in one piece. The support portions 141 extend substantially vertically. The support webs 142 extend substantially horizontally. The support portions 141 are bent downwardly, substantially perpendicularly from the support webs 142. In the mounted state of the damping module 13, the spring element 132 extends in some portions above the spindle 20, wherein the spring element 132 is deflected in some portions onto and/or into the tensioning elements 131 and guided around below the spindle 20.

The respective tensioning element 131 has a through-opening 143 through which the spindle 20 is guided in the mounted state. An edge portion of the through-opening 143 can encompass the spindle 20 in some portions.

Figure 16:
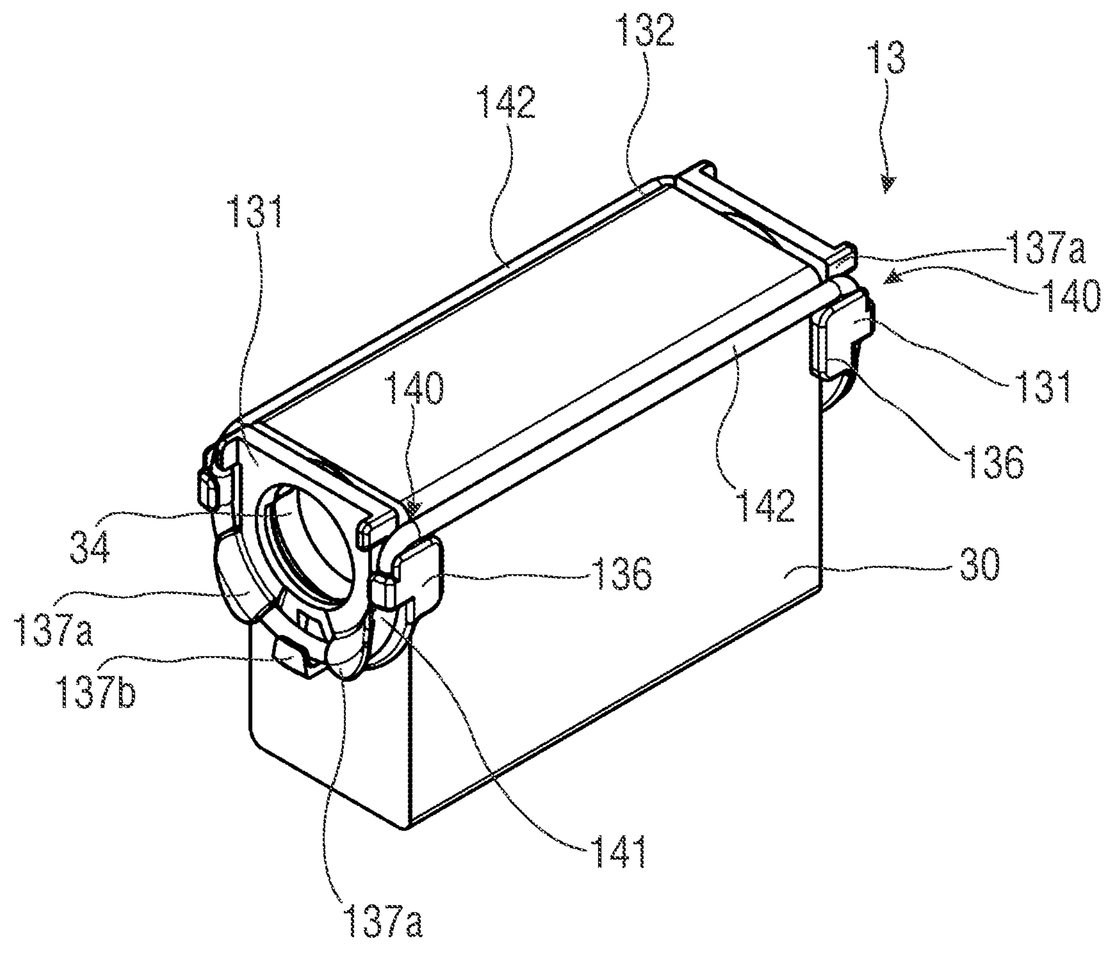
FIG. 16: shows a schematic perspective view of the spindle nut with the mounted damping module.
Figure 17:
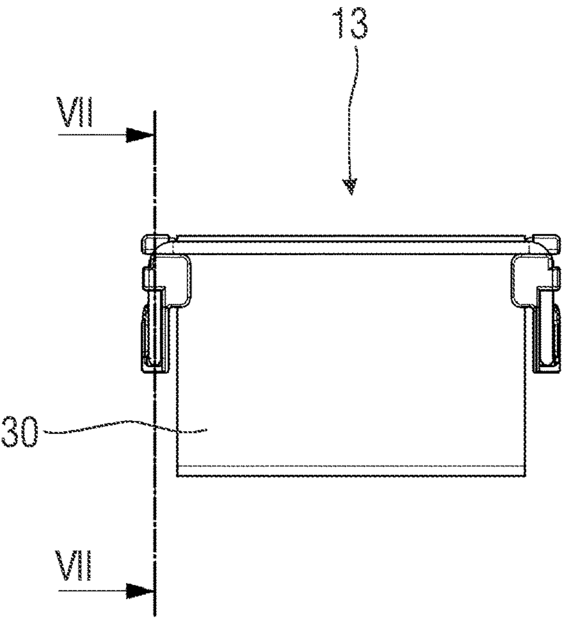
FIG. 17: shows a schematic perspective view of the spindle nut with the mounted damping module.
Figure 18:
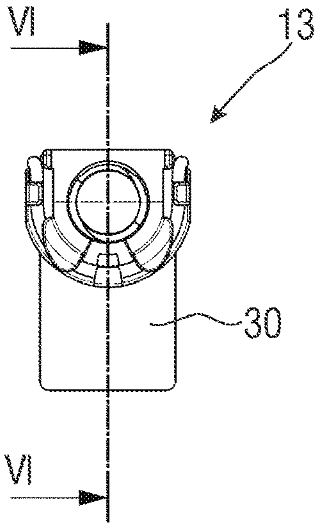
FIG. 18: shows a schematic perspective view of the spindle nut with the mounted damping module.
Figure 19:
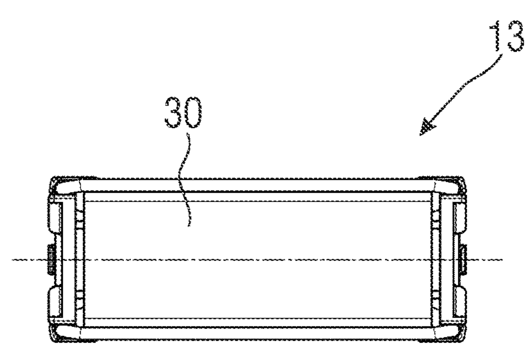
FIG. 19: shows a schematic perspective view of the spindle nut with the mounted damping module.

FIGS. 16 to 19 show schematically perspective views of the spindle nut 30 with the mounted damping module 13. FIG. 16 shows a perspective view, FIG. 17 a side view, FIG. 18 a front view and FIG. 19 a plan view of the spindle nut 30 with the mounted damping module 13. The spring element 132 holds and pretensions the tensioning elements 131 on the spindle nut 30.

For connecting the tensioning elements 131 to the spring element 132, each of the tensioning elements 131 has a number of holding portions 137*a*, 137*b*. The holding portions 137*a*, 137*b* are configured, for example, in the form of latching lugs, latching hooks or latching fingers.

The holding portions 137*a*, 137*b* protrude from an outer face of the main body of the tensioning element 131. In particular, the respective tensioning element 131 has alternating holding portions 137*a*, 137*b*. The holding portions 137*a*, 137*b* are arranged on a side of the tensioning element 131 opposing the tensioning segment 133.

The holding portions 137*a*, 137*b* are arranged so as to be alternately offset to one another in the peripheral direction of the main body. Each of the holding portions 137*a*, 137*b* has a portion 138 which is connected to the main body of the tensioning element 131 and a free portion 139, in particular a free end portion, which in one direction forms a receiver.

The holding portions 137*a*, 137*b* are arranged relative to one another such that they form a guide 140 for receiving and fixing the spring element 132. The holding portions 137*a*, 137*b* have, for example, a clipping function and/or a clamping function and/or a latching function.

The respective support portion 141 of the spring element 132 is held, in particular clamped or clipped, in a tensioned manner in the corresponding guide 140 of the respective tensioning element 131.

Figure 20:
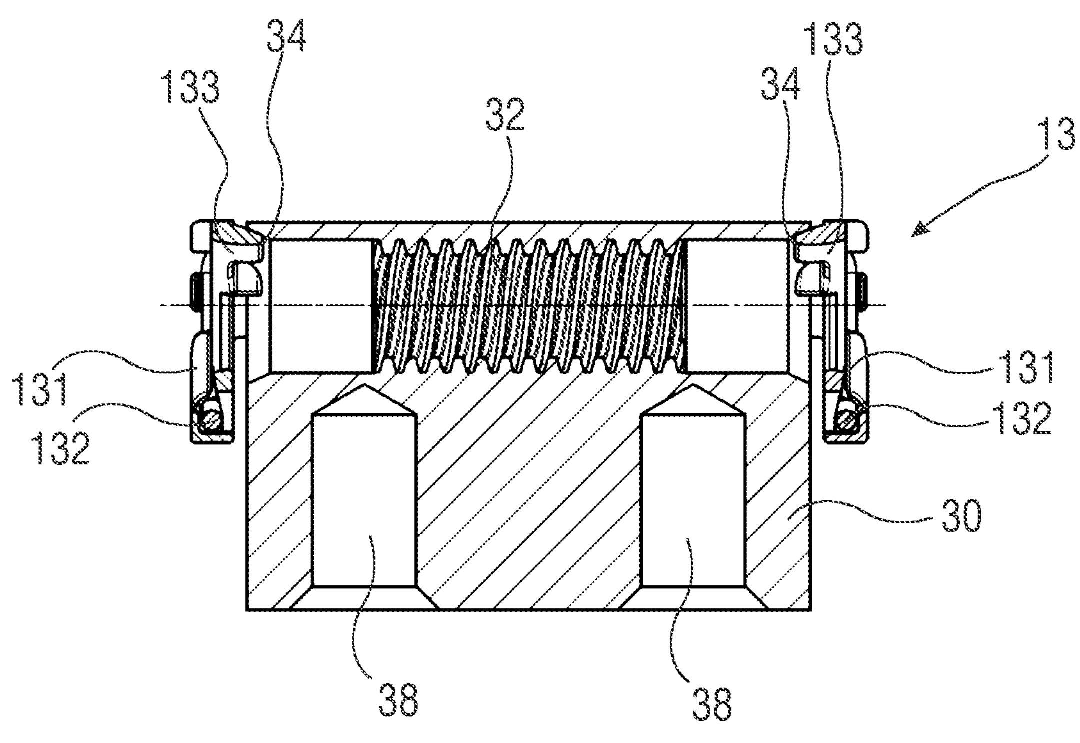
FIG. 20: shows schematically a sectional view along the line VI-VI in FIG. 18 of the spindle nut with the mounted damping module.

FIG. 20 shows schematically a sectional view of the spindle nut 30 with the mounted damping module 13. The tensioning elements 131 are held spaced part, for example by a region arranged below the spindle 20, from an outer face or outer surface side of the spindle nut 30.

The tensioning elements 131 are held in a tensioned manner by the spring element 132 on the spindle nut 30. The two support webs 142 extend substantially parallel to the spindle axis S and in the present case are arranged respectively on one of the two opposing sides of the spindle nut 30, in particular in the transverse direction y.

Figure 21:
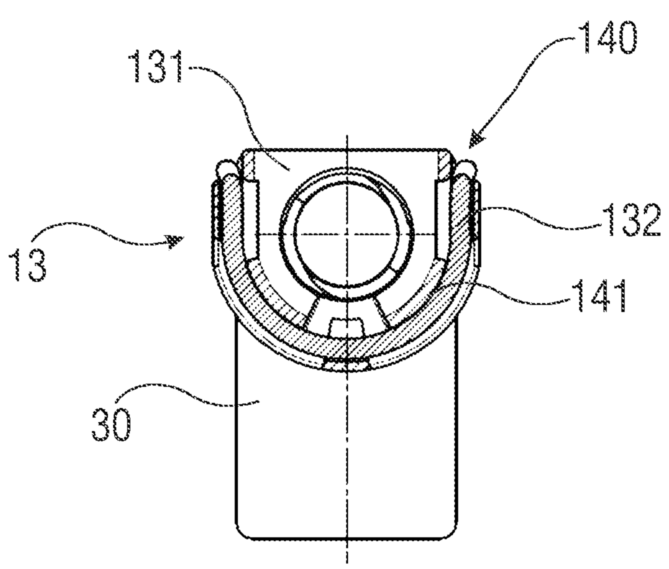
FIG. 21: shows schematically a sectional view along the line VII-VII in FIG. 17 through the damping module in the region of an end portion of the damping module.

FIG. 21 shows schematically a sectional view through the damping module 13 in the region of an end portion of the damping module 13, in particular in the region of the guide 140 formed by the holding portions 137*a*, 137*b* of a tensioning element 131.

The spring element 132 has two support portions 141 which are spaced apart from one another. The support portions 141 are configured to be substantially U-shaped.

The support portions 141 are connected together via two support webs 142. The support webs 142 are connected respectively on both sides to both support portions 141. The support webs 142 are bent once or repeatedly, for example, in the longitudinal direction x. In an alternative embodiment, a support web 142 or both support webs 142 can be bent once or repeatedly or substantially run in a straight line.

The spring element 132 is configured in one piece, for example.

Figure 22:
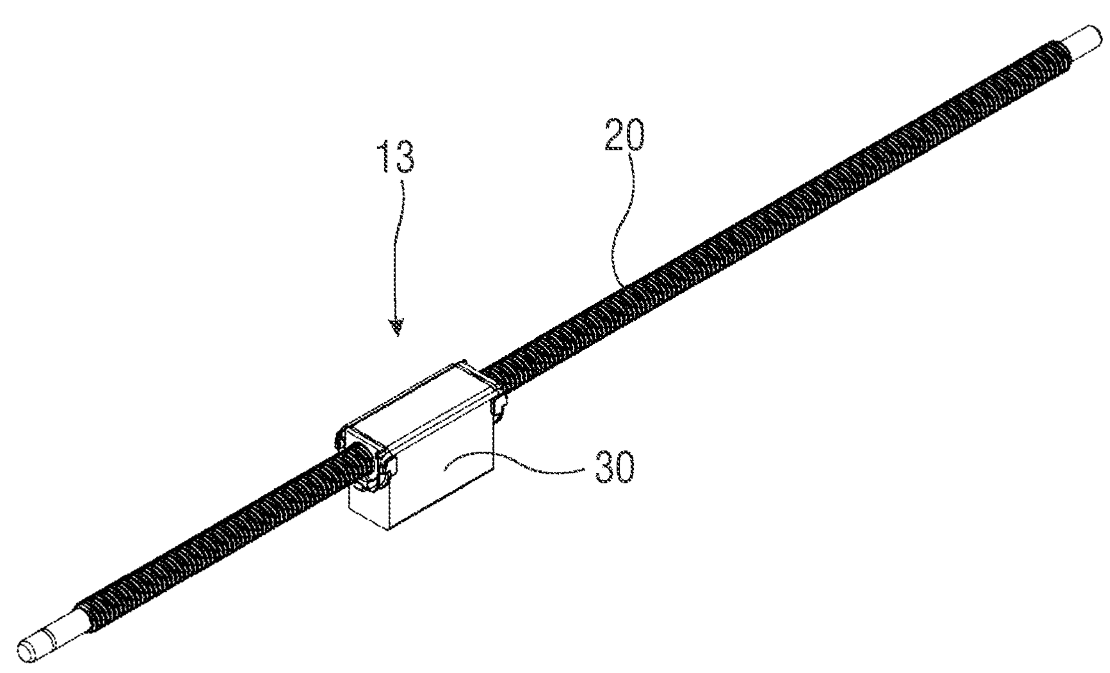
FIG. 22: shows a schematic perspective view of the spindle nut with the screwed-in spindle and the mounted damping module.
Figure 23:
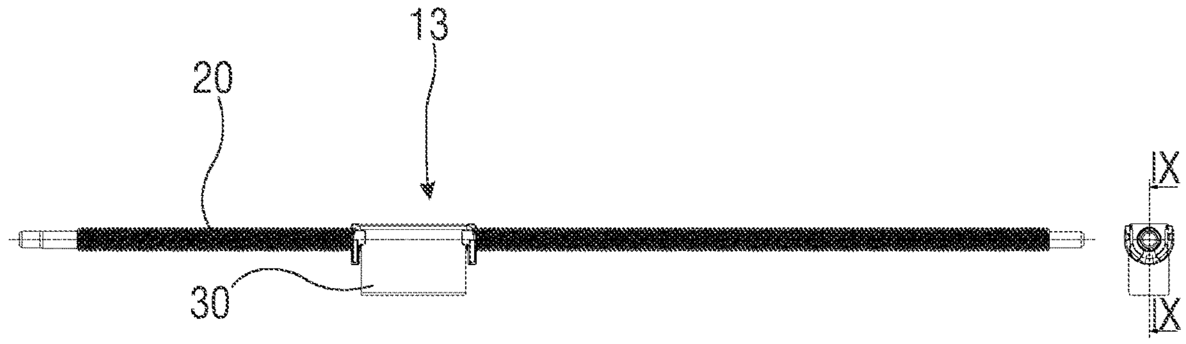
FIG. 23: shows a schematic perspective view of the spindle nut with the screwed-in spindle and the mounted damping module.

FIGS. 22 to 24 show schematically perspective views of the spindle nut 30 with the screwed-in spindle 20 and the mounted damping module 13.

FIG. 22 shows a perspective view, FIG. 23 a side view and FIG. 24 a plan view.

FIG. 25 shows schematically a sectional view through the spindle nut 30 with the screwed-in spindle 20 and the mounted damping module 13.

FIG. 26 shows schematically an enlargement of the sectional view of FIG. 25 in some portions. A cone of the damping module 13 can be used on one side. The tensioning elements 131 are held in a tensioned manner by the spring element 132 on the spindle nut 30. The two support webs 142 extend substantially parallel to the spindle axis S and in the present case are arranged respectively on one of the two opposing sides of the spindle nut 30, in particular in the transverse direction y.

The support webs 142 generate a pulling force by which the two tensioning elements 131 are subjected to a force F1 in the axial direction to the spindle nut 30, in particular in the direction of respectively one of the lead-in surfaces 34.

The contact surface 134 of the tensioning segments 133 bears against the outer periphery of the outer thread 22 of the spindle 20. The outer cone of the tensioning segment 133, which is formed opposite the contact surface 134, bears against the inner cone of the lead-in surface 34 of the spindle nut 30.

Via this wedge action, the spindle 20 can be pushed in a defined manner in the radial direction into a thread toothing, in particular a trapezoidal toothing (with steep tooth flanks). In this manner, a free lateral play and axial play can be entirely eliminated.

The tensioning elements 131 can prevent a loss of contact during an adjusting process and a vehicle operation, and thus permanently prevent the rattling noise of a metal-to-metal contact.

The spindle 20 is pushed by the outer cones of the two tensioning elements 131, in the present case downwardly, so that on each side of the spindle nut 30 the contact surface 134 of the respective tensioning element 131 bears against at least two threads of the spindle 20.

The contact surfaces 134 bearing against the spindle 20 are bent, for example in order to permit an unhindered movement of the spindle 20.

The respective tensioning segment 133 is arranged in some portions or fully in the opening 36. For example, the lead-in surface 34 positively surrounds the corresponding tensioning segment 133.

The features disclosed in the above description, the claims and the figures can be significant both individually and in combination for implementing the invention in the various embodiments thereof.

While the invention has been described in detail in the figures and the foregoing description, the drawings are to be understood to be illustrative and exemplary and not limiting. In particular, the choice of the proportions of the individual elements shown in the drawings is not to be interpreted as necessary or limiting. The invention is, in particular, also not limited to the described exemplary embodiments. For a person skilled in the art, further variants of the invention and the implementation thereof are found in the above disclosure, the figures and the claims.

Terms used in the claims such as “comprise”, “have”, “include”, “contain” and the like, do not exclude further elements or steps. The use of the indefinite article does not exclude a plurality thereof. A single device can perform the functions of a plurality of units or devices mentioned in the claims.

LIST OF REFERENCE SIGNS

1 Vehicle seat
2 Seat part
4 Backrest
10 Longitudinal adjuster
12 First rail
14 Second rail
13 Damping module
16 Internal channel
20 Spindle
20*a* Front end portion
20*b* Rear end portion
22 External thread
30 Spindle nut
32 Internal thread
34 Lead-in surface
36 Opening
38 Fixing opening
40 Fixing element
50 Spindle gear mechanism
60 Motor
70 Motor mount
100 Damping element
102, 1002 Contact portion
104 External cone
106 Contact surface
108 Contact segment
110 Tab
112 Connecting portion
114 Spring-elastic portion
131 Tensioning element
132 Spring element
133 Tensioning segment
134 Contact surface
135, 136 Tab
137*a*, 137*b* Holding portion
138, 139 Portion
140 Guide
141 Support portion
142 Support web
143 Through-opening
200, 300 Thread flank
A Spacing
L Gap
F1 First force
F2 Second force
F3 Frictional force
R1 First direction
R2 Second direction
S Spindle axis (of spindle 20)
x Longitudinal direction
y Transverse direction
z Vertical direction

The invention claimed is:

1. A longitudinal adjuster for a vehicle seat, comprising at least one rail pair which is formed from a first rail and a second rail, wherein the rails form an internal channel and the first rail is displaceable relative to the second rail in the longitudinal direction, wherein a spindle nut which is connected to the second rail and a spindle which cooperates with an internal thread of the spindle nut and has an external thread are arranged in the internal channel, wherein a spindle gear mechanism, which can be driven by a motor and which cooperates with the spindle, is arranged on an end of the first rail, wherein a damping element or a damping module is provided and arranged such that the spindle and the spindle nut are held in a pretensioned manner relative to one another in the axial direction and/or in the radial direction, wherein the damping element or the damping module comprises at least one contact portion arranged at an outer axial end of the spindle nut and which is inserted into an opening of the spindle nut and partially encloses the spindle.

2. The longitudinal adjuster as claimed in claim 1, wherein the damping element or the damping module is configured to pretension the spindle relative to the internal thread of the spindle nut radially in a first direction, such that thread flanks of the external thread are pushed against the thread flanks of the internal thread.

3. The longitudinal adjuster as claimed in claim 2, wherein a radial spacing of the thread flanks of the external thread and the thread flanks of the internal thread is increased in a second direction opposing the first direction.

4. The longitudinal adjuster as claimed in claim 1, wherein the spindle nut has a lead-in surface in at least one region adjacent to the internal thread in the axial direction.

5. The longitudinal adjuster as claimed in claim 1, wherein the damping element or the damping module has at least one contact portion with a contact surface which is in contact with the spindle at least in some portions, the contact surface being in contact with the external thread of the spindle.

6. The longitudinal adjuster as claimed in claim 5, wherein the contact surface has a convex contour running along the spindle axis.

7. The longitudinal adjuster as claimed in claim 5, wherein the damping element is configured in one piece and has at least two spring-elastic portions which subject the at least one contact portion to a first force in a direction of the spindle nut.

8. The longitudinal adjuster as claimed in claim 7, wherein thread flanks of the spindle nut and the thread flanks of the spindle are held in a pretensioned manner relative to one another by the damping module such that they are held without play relative to one another.

9. The longitudinal adjuster as claimed in claim 1, wherein the damping module comprises two tensioning elements which are arranged in each case at one end of the spindle nut and are held in a pretensioned manner relative to one another via at least one spring element.

10. The longitudinal adjuster as claimed in claim 9, wherein the tensioning elements each comprise at least one flexible holding portion which is connected to the spring element.

11. The longitudinal adjuster as claimed in claim 9 wherein the spring element comprises at least two support portions, which are spaced apart from one another, for connecting to the respective tensioning element and at least one support web connecting the support portions.

12. The longitudinal adjuster as claimed in claim 9, wherein the tensioning elements are in contact with the spindle at least in some portions.

13. The longitudinal adjuster as claimed in claim 9, wherein the tensioning elements are arranged such that they form opposing end portions of the damping module.

14. The longitudinal adjuster as claimed in claim 9, wherein the damping module additionally has a spring element which connects together the two tensioning elements.

15. A vehicle seat comprising the longitudinal adjuster as claimed in claim 1.

16. The longitudinal adjuster as claimed in claim 1, wherein the spindle nut has a lead-in surface adjacent to the internal thread, and wherein the contact portion has a tapering external contour that cooperates with the lead-in surface such that an axial force is converted into a radial force on the spindle.

* * * * *